US006444713B1

(12) United States Patent
Pachl et al.

(10) Patent No.: US 6,444,713 B1
(45) **Date of Patent: *Sep. 3, 2002**

(54) FOAMING COMPOSITIONS AND METHODS FOR MAKING AND USING THE COMPOSITIONS

(75) Inventors: Jeffrey T. Pachl, Holt; Donald Taylor, Liberty; James W. Freitag, Excelsior Springs, all of MO (US)

(73) Assignee: Denovus LLC, Excelsior Springs, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/197,124

(22) Filed: Nov. 20, 1998

Related U.S. Application Data

(63) Continuation-in-part of application No. 09/081,967, filed on May 20, 1998.

(60) Provisional application No. 60/047,273, filed on May 21, 1997, and provisional application No. 60/079,205, filed on Mar. 24, 1998.

(51) Int. Cl.[7] .................................................. C08J 9/32

(52) U.S. Cl. ............................ 521/54; 521/88; 521/94; 521/95; 521/85; 521/135; 521/140; 521/178; 522/80

(58) Field of Search ................................ 521/178, 135, 521/88, 94, 95, 85, 54; 522/80; 523/219

(56) References Cited

U.S. PATENT DOCUMENTS

| | | | | | |
|---|---|---|---|---|---|
| 2,825,282 | A | * | 3/1958 | Gergen | 521/135 |
| 3,028,344 | A | * | 4/1962 | Johnson | 521/178 |
| 3,154,504 | A | * | 10/1964 | Carey et al. | 521/178 |
| 3,618,442 | A | * | 11/1971 | Kawakami | 521/135 |
| 4,232,788 | A | | 11/1980 | Roth | |
| 4,269,890 | A | | 5/1981 | Breitling et al. | |
| 4,390,333 | A | | 6/1983 | Dubois | |
| 4,568,603 | A | * | 2/1986 | Oldham | 521/135 |
| 4,923,902 | A | * | 5/1990 | Wycech | 521/178 |
| 5,183,583 | A | | 2/1993 | Wishneski et al. | |
| 5,254,074 | A | | 10/1993 | Landers et al. | |
| 5,274,006 | A | * | 12/1993 | Kagoshima et al. | 521/135 |
| 5,339,602 | A | | 8/1994 | Landers et al. | |

FOREIGN PATENT DOCUMENTS

| | | |
|---|---|---|
| CH | 1 485 995 | 11/1974 |
| EP | 0 012 593 | 12/1979 |
| EP | 0 849 302 A1 | 6/1998 |

OTHER PUBLICATIONS

"Handbook of Epoxy Resins" by Lee and Neville, Reissue Feb. 24, 1993 (Reissue 1982) (copyright 1967) pp. 11–16 & 11–17 McGraw–Hill Book Co., 1967.*

* cited by examiner

*Primary Examiner*—Morton Foelak
(74) *Attorney, Agent, or Firm*—Michael K. Boyer

(57) ABSTRACT

A low-temperature foam compositions and that are produced from an epoxy compound and an acid source can be substantially free of polyurethane or isocyanate chemistry. The disclosed compositions and precursors thereof reduce, if not eliminate, the presence of conventional undesirable compounds and by-products thereof.

32 Claims, 1 Drawing Sheet

FOAMING COMPOSITIONS AND METHODS FOR MAKING AND USING THE COMPOSITIONS

CROSS REFERENCE TO RELATED PATENT APPLICATIONS

This is a continuation-in-part of U.S. patent application Ser. No. 09/081,967, filed on May 20, 1998 and entitled "Novel Foaming Compositions and Methods For Making and Using the Composition". The disclosure of this prior filed patent application is hereby incorporated by reference.

The subject matter herein claims benefit under 35 U.S.C. 111(a), 35 U.S.C. 119(e) and 35 U.S.C. 120 of U.S. Provisional Patent Application Serial No. 60/047,273, filed on May 21, 1997, entitled "A Room Temperature Foaming Composition"; and U.S. Provisional Patent Application Serial No. 60/079,205, filed on Mar. 24, 1998, entitled "Novel Foaming Compositions and Methods For Making and Using the Compositions". The disclosure of the aforementioned Provisional Patent Applications is hereby incorporated by reference.

The subject matter of the instant invention is also related to Non-Provisional Patent Application Ser. No. 09/081,966, filed on May 20, 1998 and Ser. No. 09/197107, filed on Nov. 20, 1998, filed on even date herewith, both filed in the name of Jeffrey Pachl et al., and entitled "Curable Sealant Composition". The disclosure of these Non-provisional patent applications is hereby incorporated by reference.

FIELD OF THE INVENTION

The invention relates to foam compositions, precursors thereof and methods for making foam compositions and foam containing articles.

BACKGROUND OF THE INVENTION

Foams are employed in a wide range of commercial applications including applications requiring thermal and sound insulation such as automotive and construction environments, among others. In the automotive industry, foams are typically formed in situ, and can be used to fill cavities such as pillars and rocker panels, and to dampen sound transmission. In situ foam formation has typically been accomplished by using a polyurethane foam based on isocyanate chemistry. Certain polyurethane foam components and by-products thereof are believed to have an undesirable environmental impact. Consequently, there is a need in this art for a low-temperature foam which is cost-effective and substantially free of undesirable materials.

SUMMARY OF THE INVENTION

The invention is capable of solving problems associated with conventional foam formulations by providing foam compositions and precursors thereto which do not require the use of isocyanates. The inventive compositions and precursors can thereof reduce, if not eliminate, the presence of conventional undesirable compounds and by-products thereof while providing benefits associated with conventional foams, e.g., sound/vibration dampening, thermal insulation, structure reinforcement, floatation, energy dissipation, among other benefits.

One aspect of the invention relates to a method of reacting an epoxy compound and a hydrogen donor or acid compound at ambient conditions to produce a foam. This reaction can produce a relatively large exotherm. The heat released by the exothermic reaction can be sufficient to drive an endothermic blowing agent, thus creating a foam virtually instantaneously. In fact, the exothermic reaction can be sufficiently large to cause a blowing agent entrapped within, for example, thermoplastic powders to expand thereby forming a foam.

Another aspect of the invention relates to a method of containing the foam during expansion by expanding the foam within a containment or control means. The control means confines the expanding foam and determines the direction of expansion. While any suitable control means can be employed, a polymeric bag or sack is desirable. The polymeric bag can be fabricated from a virtually unlimited array of materials and configured into any desirable shape.

The inventive foam can be employed in a wide array of end-uses. Examples of such uses include thermal insulation such as refrigeration, spray or rigid insulation for walls, marine foams, hot-water heaters, automotive sound dampeners, among others.

DETAILED DESCRIPTION

Figure 1:
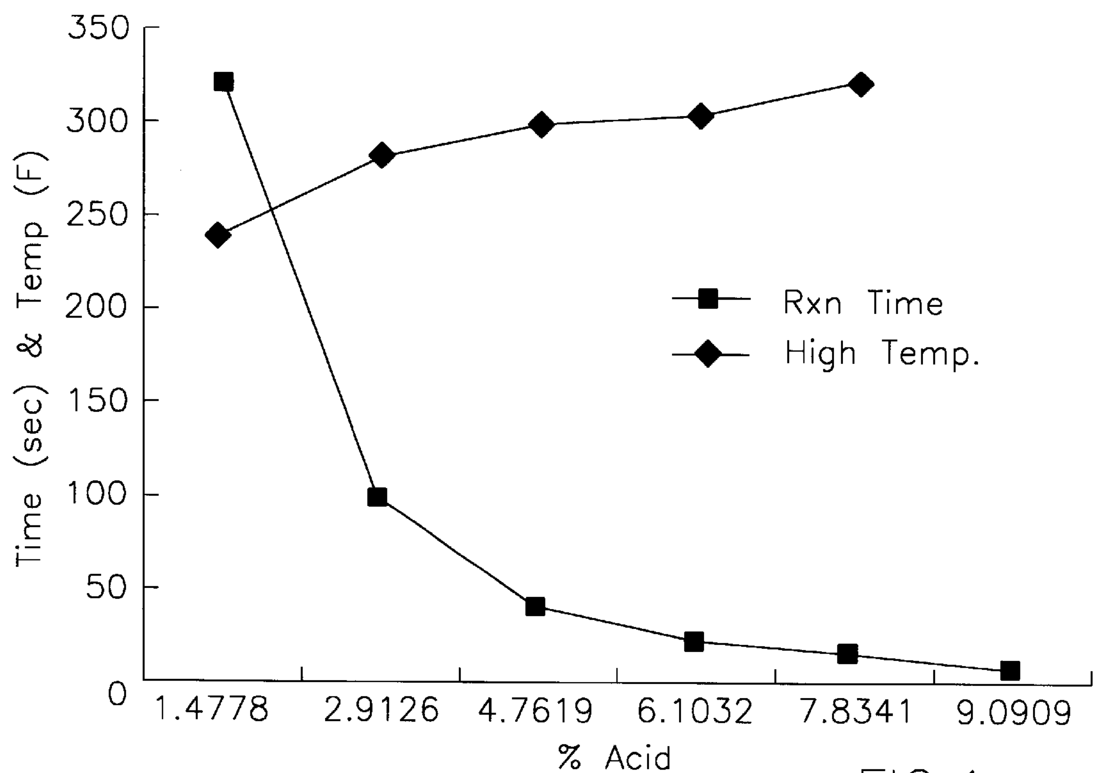
FIG. 1 is a graphical representation of the foam reaction rate and temperature as a function of percent acid.

The invention is based, at least in part, on the surprising discovery that superior foam compositions can be produced from epoxy compounds and acids or hydrogen donor compounds, and in particular, a reaction of the epoxy compounds with the acid source.

Moreover, the inventive compositions can be polyurethane and/or isocyanate free. By "free" it is meant that the inventive compositions before or after foaming contain less than about 10 wt. % polyurethane and/or isocyanurates, isocyanate, and in most cases 0 wt. %. While the presence of such compounds does not adversely affect the reaction described below in greater detail, these materials can be obviated by employing the inventive formulations. The instant invention, therefore, provides a foam which can be used with or instead of urethane/isocyanate based foams and foaming systems.

The inventive foam composition is typically obtained from the reaction of one or more foam precursors. The precursor(s) comprise (i) at least one epoxy compound, and (ii) at least one acid source, i.e., a hydrogen donor or an acid, e.g., phosphoric acid, or a compound such as a photoinitiator which can upon activation provide a hydrogen donor or an acid, and (iii) at least one expansion or blowing agent, among other components. An exothermic reaction between the epoxy and hydrogen donor or acid can activate the expansion or blowing agent thereby producing a foam.

The foam precursor(s) can comprise a single phase system that is activated in response to a source of energy, e.g., heat, UV or electron beam or laser radiation, among other energy sources, or a two component system (an A side precursor and a B side precursor) that are contacted together to produce a foam. When a two component system is employed the epoxy and acid source are provided in separate "side" components.

The first component of the precursor(s), an epoxy compound, comprises about 10 to about 80 wt % of the precursor(s). Examples of suitable epoxy compounds include bis-phenol A epoxy, bis-F epoxy, epoxy-modified elastomers, epoxy-modified polybutene, epoxy-modified polybutadiene, epoxy-modified ethylene-propylene-diene rubber (EPDM), cycloaliphatic epoxy and mixtures thereof, among others. When a two component system is employed, the epoxy is located on the A-side, or otherwise prevented from prematurely reacting with the acid or other precursors.

The first component of the precursor can be tailored by adding one or more modifiers. For best results, the modifier is solublized by the epoxy or miscible with the epoxy. Examples of suitable modifiers can comprise at least one member selected from the group consisting of styrene and co-polymers thereof, vinyls and co-polymers thereof, elastomers such as nitrile, ethylene acrylic rubber, mixtures thereof, among others. Some commercially available materials that can be employed as a modifier comprise Kraton® (Shell Chemical), Vamac® (DuPont), Piccolastic® (Hercules), Phenoxy® (Paphen), SAA® (styrene-allyl-alcohol copolymer (ARCO), G-Cryl® (Henkel), Rohagum® (Rhomtech), mixtures thereof, among others. Normally, the epoxy modifier comprises about 2 to about 50 wt. % of the composition prior to foaming.

A second component of the precursor(s) is the acid source. When a two component precursor system is employed, the acid source is present in the "B side" of the foam precursors. The hydrogen donor or acid usually comprises about 1% to about 30 wt. % of the precursor, and in particular, about 3% to about 15% of precursor B-side precursors. Examples of suitable acid sources include Lewis acids such as sulfonic acids, phosphoric acid, citric acid, carboxylic acid, glycolic, tannic and oxalic acids, and mixtures thereof, among others. Particularly desirable results have been achieved by employing sulfonic and/or phosphoric acids. If desired, the acid can comprise an acid functionally equivalent to the hydrogen donor released by a UV photoinitiator, e.g., replace a portion of the photoinitiator with its corresponding acid.

In one aspect of the invention, the hydrogen donor comprises a photo-initiator that becomes active when exposed to a source of energy. While any photoinitiator capable of becoming a hydrogen donor upon activation can be employed, specific examples of a suitable photo-initiators include a UV catalyst such as UVI 6974 (Union Carbide) that is described in greater detail in the aforementioned copending and commonly assigned U.S. Non-Provisional patent application Ser. Nos. 09/081966 and 09/192107. When such an initiator is employed, the foam precursors can be utilized in a single phase system.

For example, such a single phase system can be dispensed, exposed to a UV light source or other suitable source of energy that causes the UV catalyst to generate an acid thereby permitting the epoxy reaction to occur. The heat released by the exothermic epoxy reaction in turn activates an expansion or blowing agent, e.g., a hydrocarbon encapsulated within a thermoplastic, thereby producing a foam. While any suitable single or two phase system can be employed, normally a single phase system produces a foam that is thin relative to a two phase system. Similar to other foam precursors, the radiation activated precursors can be modified for controlling the properties of the precursors or resultant foam, e.g., about 3 to about 20 wt. % polystyrene is added to the epoxy component.

The blowing agent can comprise one or more of the blowing agents recognized in the foam-forming field. Example of suitable blowing agents include water, hydrazide, diphenyloxide-4,4-disulphohydrazide, carbonamide, azocarbonamide, hexamethylene diamine carbamate, sodium bicarbonate, carbon dioxide, fluorocarbons such as difluoroethane, tetrafluoroethane, among others; and hydrocarbons such as butane, propane; mixtures thereof, among others. Normally, the expansion or blowing agent comprises about 5 to about 40 wt. % of the foam precursor(s). The blowing agent can be present in either the A or B side of a two component system, although the B-side precursor is preferred.

The foam precursor(s) can also include at least one carrier component, e.g., a polyol, and optional components such as thermoplastics. A carrier usually comprises about 20 to about 40 wt. % of the precursor, e.g., preferably about 30 wt. %. The carrier typically serves to deliver a component, e.g., an acid, expanding agent, catalyst, mixtures thereof, among others for contact with the epoxy. Examples of suitable carriers comprise at least one member selected from the group of polyester polyols, polyvinyl alcohol, water, among other carriers that are preferrably miscible with the epoxy and mixtures thereof. When a two component precursor system is employed, these carrier materials are typically added to the acid side or "B side" component of the foam precursors. Depending upon the relative concentration of the components of the precursor, polyvinyl alcohol, hydroscopic polyolefin such as polypropylene (as well as other suitable materials) can be employed for absorbing steam or water generated by the exothermic reaction.

The components of the precursor can be tailored by adding one or more modifiers in order to control viscosity, improve stability, among other characteristics. For best results, the modifier is solublized by the carrier or miscible with the carrier. Examples of suitable modifiers can comprise at least one member selected from the group consisting of natural and synthetic oil such as castor, soy, canola, linseed, polybutene, among other oils. For example, by adding castor oil to the carrier, e.g., Part B-polyester polyol, a relatively hard foam can be obtained. Normally, the carrier modifier is used about 2 wt. % to about 50 wt. % of the composition prior to foaming.

Moreover, the density, moisture and temperature resistance among other physical properties of the final foam product can be modified or tailored by adding a thermoplastic, theromset, plastic or resinous material to the epoxy-containing precursor. While any suitable modifying material can be employed, examples of such modifying materials include dicyandiamide (Dicy (Amicure CG 1400)), ethylene vinyl acetate, polypropylene, polyethylene, lo rubber, phenoxy resin, phenolics, powdered wax, solid epoxy such as bis-A epoxy or modified epoxy, mixtures thereof, among others. About 1 to about 60 wt. % of modifying material can be added relative to the epoxy, e.g., about 2 wt. % of the precursor(s). The modifying material will normally comprise a powder having a particle size less than about 20 microns and a melting point from about 200 to about 400 F. The modifying material will become fluid and normally melt when exposed to the exothermic reaction temperature. When a two component precursor system is employed, these materials are normally, but not necessarily, combined with the epoxy or "A side".

The thermoplastic component of the foam precursor(s) can comprise at least one member selected from the group consisting of acrylonitrile, polyethylene, phenolic, wax, EVA, polypropylene, GMA, acid modified polyethylene, polybutadiene, modified polyethylene blend (such as Bynel® supplied by DuPont Company), SIS or SBS or SEBS blocked copolymers (such Kraton® supplied by Shell Chemical), among other thermoplastic materials that can be dispersed in a foam precursor and have a melting point less than about the aforementioned exothermic reaction and mixtures thereof. Normally, the thermoplastic component of the precursor will comprise about 2% to about 60 wt. % of the precursor. The thermoplastic component can possess any desirable configuration or particle size. In some cases, the thermoplastic component can form a film or skin upon an exterior surface of the foam thereby improving the resistance of the foam to fluids, e.g., water, gasoline, among other fluids.

In one particularly useful aspect of the invention, a liquid or gaseous blowing agent is combined with or encapsulated within a thermoplastic particle or powder, e.g., a hydrocarbon encapsulated within an acrylonitrile shell as in Expancel® that is supplied by Expancel Inc., a division of Akzo Nobel Industries. When a two component precursor system is employed, the shells are normally combined on the B side along with the carrier. These shells can, however, be combined with the A side or in a single phase system so long as the composition of the shells is not substantially affected by the epoxy, e.g, the acrylonitrile or vinylidene chloride shells may be soluble within the epoxy. For example, the shells can be fabricated from polyethylene, nylon, EVA, polypropylene, among other materials not soluble in the epoxy component, and mixtures thereof could be present in the epoxy component of a two phase precursor system. Specific examples of suitable encapsulated blowing agents comprise at least one member selected from the group of hydrocarbons such as isobutane and isopentane and fluorocarbons such as 1-1dichloroethene that are encapsulated within a thermoplastic such as 2-methyl 2-propenioc acid methyl ester polymer with 2-propenenitrile and vinylidene chloride polymer and polyvinylidene fluoride. These materials are supplied commercially by Expancel, Inc., a division of Akzo Nobel as Expancels® 051WU, 051DU, 091DU80, 820WU, 820DU, 642WU, 551WU, 551WU80, 461DU or Micropearl® F30D supplied by Pierce and Stevens. These materials can be supplied in either dry or wet form. When the A and B sides are contacted (or in the case of a single phase system exposed to an energy source), the epoxy reacts with the hydrogen or acid thereby releasing heat and causing the expansion agent within the shells to foam. The foam can be characterized by a composite wherein the epoxy reaction product (including of the aforementioned modifying materials) forms a matrix that embeds the expanded shells. Depending upon the physical characteristics desired in the foam, the shells can be open or closed cells.

The foam characteristics can also be modified by adding one or more filler materials to the precursor(s). Conventionally used filler materials comprise at least one of talc, mica, magnesium silicate, oxidized polyethylene, sodium silicate, alcohols, petroleum jelly, aromatic acid methacrylate-mixed half esters, methacrylated polybutadiene, concrete mix (supplied commercially as Quickrete®), arylalkoxy silane, hollow ceramic spheres, inorganic microspheres, dispersants, conventional blowing/expansion agents, flame retardants, antimicrobial agents such as fungicides, fumed silica, mixtures thereof, among others. If desired calcium carbonate can be added to the foam precursor for increasing the hardness and density of the resultant foam. When included the filler comprises about 2 to about 60 wt. % of the foam precursors.

In one aspect of the invention, one or more foam precursors interact to form an intermediate foam precursor. The intermediate foam precursor can correspond to a Part A and/or Part B. The intermediate foam precursor can be contacted with another precursor or another intermediate foam precursor in order to obtain a foam. A carrier such as a polyol, e.g., a polyester polyol, can interact with at least one member selected from the group of an acid source, e.g, phosphoric acid; a modifier, e.g., styrene; among other precursor components. An epoxy can interact with at least one member selected from the group of an acid source, e.g., phosphoric acid; a modifier, e.g., styrene; among other precursors that are miscible with the epoxy. If desired the aforementioned carrier containing intermediate product is contacted with the aforementioned epoxy containing intermediate product to obtain a foam. The intermediate precursor can be self-supporting. The combined intermediate products can produce a gel-like product that in turn is converted to a foam, e.g, the intermediate product can comprise a gel that can be shaped prior to onset of foam formation.

The precursor(s) and/or intermediate products thereof can be pre-blended and stored in separate containers prior to use. To this end, an A-side or first precursor mixture is typically obtained by combining the epoxy and modifying material, e.g, polyvinyl alcohol and polypropylene, and a B-side or second precursor mixture can be obtained by combining the carrier, e.g., a polyol, hydrogen donor/acid and thermoplastic, e.g., encapsulated blowing agent.

The precursor(s) can be produced using any suitable apparatus that imparts an amount of shear sufficient to obtain a substantially homogenous precursor. Examples of suitable apparatus comprise hand mixing, static tube mixtures, the structures described illustrated by FIGS. 2A and 2B (described below in greater detail), among other conventional apparatus. Normally, the samples are mixed for about 1 to about 40 seconds depending upon the composition and mixing environment, e.g., a 1:1 A:B composition can be mixed for about 1 to about 10 seconds in a static tube mixer.

The inventive method involves contacting the epoxy compound and acid or hydrogen donor under conditions effective to provide an exothermic reaction. The heat produced from the reaction can then cause the blowing agent(s) to expand in forming the desired foam. For example, where two precursors, A and B are employed, the two compositions can be combined to obtain a foam by using conventional foam manufacturing equipment. For example, A-side and B-side can be contacted as two high pressure streams within a mixing chamber of an external mix-head. While heat can be added to the precursors, the reaction between "A" and "B" can occur under ambient conditions. The ratio of A-side to B-side normally ranges from about 1:1 to about 5:1 or 1:5.

An example of a combined A and B side precursor composition is set forth in the following Table.

TABLE

| Chemical Name | Trade Name | Supplier | Wt. % | Equivalent |
|---|---|---|---|---|
| Cyclo-aliphatic Epoxy | Uvacure 1500 | UCB Radcure | 1–80 | Sartomer-SARCAT ® K126 |
| Polyester Polyol | Tone 0301 | Union Carbide | 0–70 | — |
| Phosphoric Acid | Phos. Acid | J.T. Baker | 1–20 | commodity |
| Themo-plastic | Ex-pancel | Nobel Industries | 1–50 | Pierce & Stevens-Micropearls ® |

The pH of the A-side component (containing the epoxy compound(s)) is normally about 6 to at least about 8. The pH of the B side of the foam precursor comprising an acid and a carrier is normally about 0.5 to about 4, e.g, the pH of phosphoric acid when mixed with polyol. Normally, the pH prior to reaction with A-side precursors is about 1.6. The composition and concentration of the foam precursors can be modified to achieve a predetermined reaction rate e.g., by tailoring the concentration of the acid. The affects of the pH or acid concentration of the B side are better understood by reference to FIG. 1 which illustrates the affects upon the composition demonstrated in Example 9.

Referring now to FIG. 1, FIG. 1 is a graphical representation of % acid in the precursor versus foam reaction time and temperature. FIG. 1 illustrates that as the acid concentration increases the reaction temperature increases and the reaction time decreases. FIG. 1 also illustrates that the precursor can be selected to a predetermined reaction time/temperature. For example, by selecting a higher reaction temperature (higher acid concentration) a wider range of modifying materials can be employed whereas by selecting a slower reaction time (lower acid concentration) the foam has easier handling characteristics.

The viscosity of a foam precursor can be tailored to enhance the resultant foam characteristics. The viscosity of the "A-side" or epoxy component of the foam precursor is normally controlled, for example, so that a modifying material, e.g., a plastic powder, becomes or remains dispersed within the "A-side" precursor. While any suitable viscosity control agent can be employed desirable results can be achieved by using a solid polymer (in particulate form) to produce a foam precursor gel.

Examples of suitable solid polymers comprise at least one member selected from the group consisting of waxes, polyethylene, EVOH, PVOH, fluoropolymers and dispersions thereof such as polytetrafluoroethylene (supplied as Teflon® by the DuPont Company), among others. The viscosity control agent can range in particle size of about 20 to 50 microns, e.g,. less than 325 mesh. An example of a controlled viscosity composition comprises about 5 to about 10 wt. % solid epoxy, about 5 to about 15 wt. %, powdered polyethylene and about 25 to about 30 wt. % blowing agent. In addition to viscosity, the characteristics of the foam can be tailored by varying the temperature, pressure, foam pH, foam density, among other parameters known to those skilled in this art. Also, the "A-side" of the system can be thickened into a gel by the addition of a surfactant such as any commercially available liquid detergent or titanate such as Kenrich KRTTS, e.g., about 0.5 to about 3 wt. % surfactant. This enables a more complete Theological control, included insuring the homogeneity of the system.

As discussed above, the foam can be produced from a single phase system, e.g., only an "A-side" mixture. An example of such a system comprises an epoxy, a polyol, thermoplastic spheres, modifying materials, phenoxy, polypropylene, mixtures thereof, among other components. This one component system can be heat activated. In other words the system expands by being exposed to elevated temperature, e.g., about 125 C. If desired the single phase foam system can be initiated by employing a photo-initiator instead of, or in conjunction with, an elevated temperature. Examples of such initiators comprise at least one member selected from the group consisting of Union Carbide UVI 6974 among others. Normally, the amount of such an initiator corresponds from 0.5 to about 5 wt % of the foam precursor. More details regarding photoinitiators can be found in "Photopolymerization Behavior of Several Cationic Photoiniators in Catatonically Cured Resin Systems" by Edward Jurczak; that is hereby incorporated by reference.

Single phase systems are especially useful when applied upon a substrate by being sprayed. For example, the single phase system can be sprayed upon an automotive subassembly for reducing the amount of sound transmission to the interior of the car. In a further example, the single phase system can be sprayed upon a first component, e.g., a plastic facia, exposed to UV to cause foaming and affixed upon a second component, e.g, metal support member, wherein the foam functions to reduce vibrations between the components.

A composite foam structure can be obtained in accordance with the instant invention. A structural modifier such as fibers, particles, rods, tubes, powders, mixtures thereof, among others, can be incorporated as a component of the foam precursor. The structural modifier can be employed for tailoring the chemical and/or physical properties of the resultant foam. Examples of suitable structural modifiers, normally as chopped fibers, ceramic or glass spheres or powders, can comprise at least one of nylon, carbon, carbonates, polymers such as polyethylene and polypropylene, graphite, Kevlar®, Dyneon, ceramic, fiberglass, mineral fillers, e.g., mica, metals, among other materials. The amount of such structural modifiers normally comprises about 1 to about 60 wt. % of the uncured foam precursor.

Any suitable commercially available foam production equipment can be employed for mixing and dispensing the inventive foam precursors to obtain the inventive foam. Examples of such equipment comprises DoPag (ECONO-MIX) supplied by Kirkco Corporation, Monroe, N.C.; as well as equipment supplied commercially by Jesco Products Company, Inc, Sterling Heights, Mich. Another example comprises using a Econo-Mix pump in combination with a Albion static mix head. The foam precursors can also be mixed by employing a power mix gun such as supplied by Sealant and Equipment Company, Oak Park, Mich. If desired, the inventive foam can be expanded with in a cavity, e.g., an automotive A pillar, by employing a dispensing apparatus having a replaceable/disposable static mix head. That is, the static mix head can comprise a replaceable plastic tubing having a center piece with a helix or vortex configuration, that is connected to a pump discharge flange and inserted into the cavity for foaming the precursors.

Figure 2A:
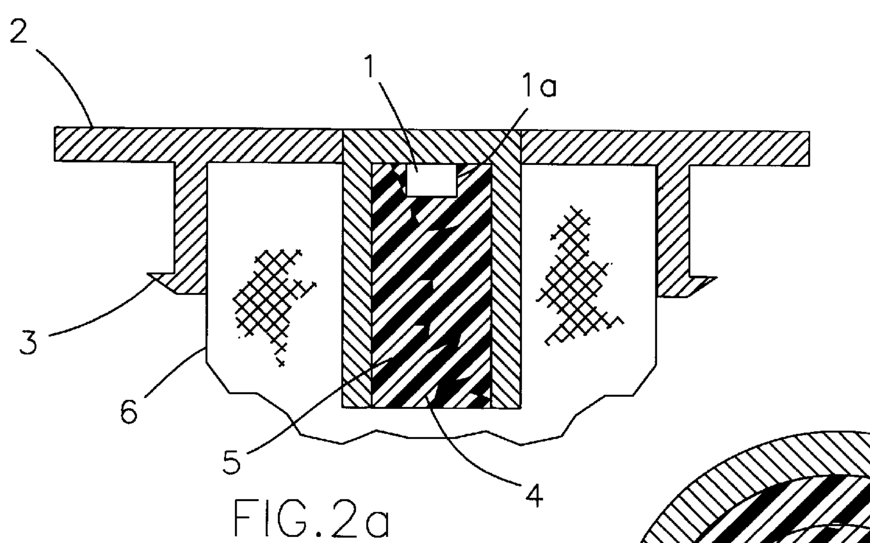
FIGS. 2A and 2B are a schematic drawings of assemblies that can be employed for dispensing the inventive foam within a defined cavity or area.
Figure 2B:
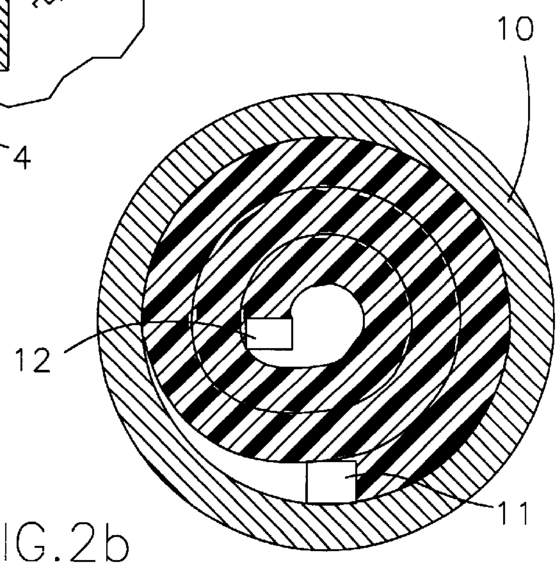

Another static mix head design has a valve type of arrangement that is illustrated in FIGS. 2A and 2B. Referring now to FIG. 2A, FIG. 2A illustrates a one-way value type of arrangement wherein the foam or precursors thereof are introduced or injected via a one-way valve 1 (commonly known as a zerk) that is positioned within a cap 2. Valve 1 can also include a flap or secondary valve 1A that prevents foam from escaping by reverse flow through valve 1. The cap 2 seals or defines one end of a cavity being filled with foam. The cap 2 can include hooks or locking tabs 3 for securing the position of cap 2, e.g, within the so-called A pillar of an automobile thereby permitting foam to be dispensed within the automotive cavity in a controlled manner. Normally, one end of the valve 1 is connected to a mixing zone 4 such as the aforementioned static mixers having helical vanes 5. After traveling through the valve 1 and static mixer 4, the foam is released into the cavity to be filled with foam. The area and direction into which the foam expands can be control and/or defined by using a containment means such as a polymeric bag 6 (the containment means is described below in greater detail).

Referring now to FIG. 2B, this type of arrangement provides a longer mixing time for the foam precursors before the foam is released into the cavity to be filled. The arrangement illustrated in FIG. 2B can also be employed as a cap 10 to seal or define one end of the cavity to be sealed. After delivering the foam precursors, a mix head 11 or previously described valves (4 and 5 of FIG. 2A). The foam precursors travel through mix head 11 and are released at the opening defined at 12 as a foam. The opening 12 can also be within the aforementioned containment means. The caps 1 and 10 can remain associated with the foam product within the cavity. By using such a replaceable mix head, any problems associated with clogged mix heads are avoided. Two pressure streams can also be employed, to converge in a mix chamber or cavity to be foamed and mix action occurs without use of additional mixing apparatus. In addition to the foregoing, the inventive foam composition and precursors thereof can be injected, extruded, shaped, sprayed, cast, molded, among other conventional processes in order to obtain a desirable foam article. The configuration of the foam article can be virtually any shape including continuous shapes such as films or webs, discrete forms, among other shapes.

While the above description emphasizes particular foam compositions, the inventive compositions (and precursors thereof) can include additives such as dyes, fillers, surfactants, pigments, nucleating agents, among other conventional employed foam additives. If desired a pH indicator can be added to the precursor in order to provide a visual detection means for a reaction product. An example of a suitable pH indicator comprises at least one member selected from the group consisting of methyl red, methyl blue, chlorophenol red, bromothymol blue. That is, as the foam precursor react, e.g, acid-epoxy, the acid is consumed thereby changing the pH and causing the pH indicator to change color.

If desired, the inventive composition can be laminated or joined with other articles, e.g., laminated onto metal foil, mylar, fiberboard etc. The inventive composition can also be expanded within a control or containment device or bag having a predetermined shape thereby forming a foamed article that replicates the bag, e.g, refer to U.S. Pat. No. 4,269,890 (Breitling), U.S. Pat. No. 4,232,788 (Roth), U.S. Pat. No. 4,390,333 (Dubois); the disclosure of each of which is hereby incorporated by reference. When expanding the foam into a bag, the previously described valves illustrated in FIGS. 2A and B, those supplied commercially by Inflatable Packaging as part no. IP04, or any other suitable delivery means can be employed at the opening in the bag in order to control introduction of the foam into the bag.

For example, a bag replicating a cavity such as an automotive cavity or any other desirable configuration unrolls or expands into the cavity as foam is introduced into the bag via the valve. If desired, the bag may comprise or be coated with a heat sensitive adhesive wherein the heat generated by the exothermic foam reaction activates the adhesive. The adhesive can permanently affix the foam containing bag at any desirable location. The bag can also include predetermined areas having weakened seams or perforations that are designed to rupture as the foam expands thereby directing the expanding foam. Similarly, the bag composition can be selected such that the bag melts when exposed to the foam. The melting bag can direct the expanding foam, form a coating upon the foam, function as an adhesive, among other utilities. Further, a plurality of bags can be employed wherein one bag is surrounded by another bag. The inner and/or outer bag can possess the aforementioned predetermined properties. Furthermore, the bag can comprise areas having distinct chemical and/or physical properties, e.g., a bag comprising one sheet of polyethylene heat sealed around its peripherey to a sheet comprising polybutadiene. At least a portion of the bag can be fabricated from one or members selected from the group consisting of polyethylene, polyester, vinyl, nylon, Surlyn®, ethylene vinyl acetate, styrene-isoprene-styrene, styrene-butadiene-styrene or other blocked copolymers, polybutadiene, among other plastic materials with melt points corresponding to temperature range of reaction, polyamide, modified EVA's, modified polyethylene, modified polybutadiene, GMA, SBR, among other plastic materials suitable for bag or bladder construction and seaming capability. The bag or containment means can be utilized with a wide range of foam compositions in addition to the previously described epoxy containing foams. Examples of foams that can be expanded into the previously described containment bags or means comprise at least one of epoxy amine, acrylic, phenolic among others.

The following Examples are provided to illustrate not limit the scope of the invention as defined in the appended claims. Unless indicated otherwise, commercially available apparatus and materials were employed in these Examples.

EXAMPLE 1

A foam product was produced by mixing a 2-part system (A-side precursor and B-side precursor) through a conventional foam production apparatus comprising a static mixer that was manufactured by Albion (Model No. 535-1 or equivalent). The constituents of the foam were maintained in two separate supplies of materials, an A-side precursor and B-side precursor.

The A-side precursor comprised a blend of the epoxy and the thermoplastic microspheres including a blowing agent, in ratio of 30 parts to 15 (100 parts total). The B-side precursor comprised a blend of the phosphoric acid and the polyol in a 30 part to 50 part ratio (also 100 parts). The feed ratio of A-side precursor to B-side precursor to the mixer head was 1:1. The pH of the B-side precursors was about 1.6 prior to reaction with A-side precursor.

A pressurized flow through the mixing chamber produced a polymer which rapidly expands and released an amount of exothermic heat sufficient to produce a foam.

EXAMPLE 2

The process of Example 1 was repeated with the exception that the ratio of epoxy to thermoplastic microspheres in A-side precursor was 2:1, and the ratio of phosphoric acid to polyol in B-side precursor was 3:5. The feed ratio of A-side precursor to B-side precursor to the mixer head was 3:1.

EXAMPLE 3

The process of Example 1 was repeated with the exception that the A-side precursor and B-side precursor components were mixed together by hand (instead of using the static mixer).

EXAMPLE 4

This example demonstrates the formation of a composite foam. The process of Example 1 was repeated with the exception that about 5 wt. % polytetrafluoroethylene powder (TEFLON® supplied by the DuPont Company) was added to the A-side precursor composition. The A-side precursor and B-side precursor were contacted in the manner described in Example 1. A composite foam was recovered wherein the composite foam had greater flexibility or pliability in comparison the foam obtained by the process of Example 1.

EXAMPLE 5

A two phase system was used to produce a foam. The A-side precursor was composed of epoxy and microspheres in a 2:1 ratio (67% epoxy, 33.3% microspheres) by weight. (It is noted that for best results, the mix should be used within in 4–8 hours of mixing since epoxy can dissolve certain spheres). The A-side precursor was hand-stirred to a smooth consistency.

The B-side precursor was composed of Polyol (Tone 0301) and Phosphoric acid (10%) by weight). The acid was blended into the polyol. A-side precursor to B-side precursor ratio of 1:1 was contacted in a static tube mixer and produced a foam. The ratio of A to B can be from 1:1 to 4:1 depending on acid concentration.

EXAMPLE 6

A two phase system was used to produce a foam. The A-side precursor comprised an of epoxy (UCB-Radcure UVACURE 1500). The B-side precursor was comprised of a polyol (50 wt. %—Tone 0301), phosphoric acid diluted with water (approximately 50% acid in a commercially available solution) at 20%, and 30% microspheres. The spheres were hand-stirred into the polyol to a smooth consistency. The acid mixture was blended by hand-stirred into the sphere-polyol mix. An A-side precursor to B-side precursor ratio of 1:1 was contacted in a static tube mixer and produced a foam. The ratio of A to B can be from 1:1 to 4:1 depending on acid concentration.

EXAMPLE 7

A two phase system was used to produce a foam. The A-side precursor comprised an epoxy (UCB-Radcure UVA-Cure 1500) While the B-side precursor comprised polyol (Tone 0301), polyvinyl alcohol and water blend (PVOH: H20 3:1 blend that corresponded to 20% of the polyol) and microspheres 30% by weight of polyol and acid can be 10% of total ‘B’ mixture. The spheres were hand-stirred into the polyol to a smooth consistency. The PVOH and water are hand-stirred. The PVOH/water solution temperature was 140° F. The PVOH blend was added to the polyol by hand stirring. The acid was hand-stirred into the sphere-PVOH-polyol mix. The A-side precursor to B-side precursor ratio of 1:1 was contacted in a static tube mixer and produced a foam. The ratio of A to B can be from 1:1 to 4:1 depending upon acid concentration.

EXAMPLE 8

A two phase system was used to produce a foam. The A-side precursor comprised an epoxy (UCB-Radcure UVA-Cure 1500) and a phenoxy resin (Paphen PKHP-200 that corresponded to 25% of A-side precursors, epoxy is 75% of A-side precursors). The B-side precursor comprised 45% polyol (Tone 0301), 23.5% polyvinyl alcohol (Airvol 203S) and 23.5% microspheres. Phosphoric acid was 10% by wt. of the B-side precursor. Spheres are hand-stirred into the polyol to a smooth consistency. The PVOH, microspheres, and polyol are blended by hand stirring. The phosphoric acid was hand-stirred into the sphere-PVOH-polyol mix. An A-side precursor to B-side precursor ratio of 1:1 was used contacted in a static tube mixer to produce a foam. The A to B ratio can range from 1:1 to 4:1 depending on acid concentration.

EXAMPLE 9A

A two phase system, namely an A-side precursor and a B-side precursor, was used to produce a foam. The A-side precursor comprised an epoxy (UCB-Radcure UVACure 1500) 60 wt %, polypropylene powder (Equistar FP 800-00) 20 wt %, polyvinyl alcohol (Airvol 203S) 20 wt %. The B-side precursor comprised polyol (Tone 0301) 60 wt % and microspheres 30%. Phosphoric acid was 10%. Spheres are hand-stirred into the polyol until a smooth consistency was obtained. The microspheres and polyol are blended by hand stirring. The phosphoric acid was hand-stirred into the microspheres and polyol mix. An A-side precursor to B-side precursor ratio of 1:1 was used and contacted in a static tube mixer to produce a foam. The A to B ratio can, however, range from 1:1 to 4:1 depending on acid concentration.

EXAMPLE 9B

This Example employed a two phase system wherein the A-side precursor comprised a gell. A two phase system, namely an A-side precursor and B-side precursor, was used to produce a foam. The A-side precursor comprised an epoxy (UCB-Radcure UVACure 1500) 59 wt %, polypropylene powder (Equistar FP 800-00) 20 wt %, polyvinyl alcohol (Airvol 203S) 20 wt % and surfacant (gelling agent) at 1 wt %. The B-side precursor comprised polyol (Tone 301) 60 wt % and microspheres 30%. Phosphoric acid was 10%. Spheres are hand-stirred into the polyol until a smooth consistency was obtained. The microspheres and polyol are blended by hand stirring. The phosphoric acid was hand-stirred into the microspheres and polyol mix. An A-side precursor to B-side precursor ratio of 1:1 was used and contacted in a static tube mixer to produce a foam. The A to B ratio can, however, range from 1:1 to 4:1 depending on acid concentration.

EXAMPLE 10

A bag or containment device approximately 8×8 inches in size and having a one-way valve located on one end of the bag was constructed from two sheets of high density polyethylene film. The seams of the bag were designed to rupture at specific locations, which directs foam expansion into cavity area adjacent to weak seams. The sheets were joined by heating on a TEW Electric Heating Company Ltd sealing apparatus. The seams were selectively reinforced by double sealing or weakened to provide multiple points for foam direction from the same bag. The foam composition demonstrated by Example 9 was introduced into this bag. As the foam expanded, the foam escaped from the bag through the relatively weak seams.

EXAMPLE 11

A bag or bladder composed of each of polyethylene, ethylene vinyl acetate, polybutadiene were fabricated by using the apparatus described in Example 10. The foam of Example 9 was introduced into these bags. The bags, having a melting point less than the exothermic reaction temperature of the foam, failed and released the foam.

EXAMPLE 12

A bag or bladder composed of each of modified EVA (Bynel®), modified polyethylene (Primacor® supplied by Dow Chemical Company), modified butadiene, glycidal methacrylate (GMA) were fabricated by using the apparatus of Example 10. The foam of Example 9 was introduced into these bags. The heat released from the exothermic reaction of the foam caused the bags to melt. The melting bag material adhered to the foam thereby modifying the surface of the foam. The melting bag also adhered the foam to any surrounding surfaces or articles.

EXAMPLE 13

A bag or bladder composed of each of polypropylene, polyethylene, woven nylon mesh, aluminized fiberglass mesh was fabricated by using the apparatus of Example 10. Each of the bags was further processed to possess multiple perforations (25–100 holes/in.). The foam of Example 9 was introduced into each of these bags. The perforations allowed the foam to escape in controlled quantities while also generally retaining the shape of the bag.

EXAMPLE 14

Two bags or bladders, namely an inner and outer bag were fabricated by using the apparatus of Example 10. The inner bag comprised modified butadiene and the outer bag comprised high density polyethylene. The inner bag was placed within the outer bag and the outer bag was sealed. The foam of Example 9 was introduced into the inner bag. Inner bag or bladder melted during the foam reaction. The inner bag was of sufficient size to contain the required amount of mixed foam precursors to fill the out bag. Outer bag construction was of material and size to contain reaction within the cavity.

EXAMPLE 15

The insertion loss or sound dampening characteristics of the foam produced in accordance with Example 9A was tested in accordance with Society of Automotive Engineers (SAE) J 1400. The sample size was 3×3×10 inches and placed within an E-coated metal channel. An increase in insertion loss corresponds to an increase in sound dampening properties that in turn corresponds to less noise within the passenger compartment of an automobile.

| FREQ. (Hz) | INSERTION LOSS (dB) |
|---|---|
| 125 | 12.5 |
| 160 | 10.6 |
| 200 | 11.4 |
| 250 | 12.0 |
| 315 | 24.5 |
| 400 | 35.4 |
| 500 | 46.8 |
| 630 | 38.4 |
| 800 | 40.1 |
| 1000 | 45.7 |
| 1250 | 45.1 |
| 1600 | 49.6 |
| 2000 | 49.2 |
| 2500 | 50.1 |
| 3150 | 50.9 |
| 4000 | 55.5 |
| 5000 | 58.7 |
| 6300 | 59.2 |
| 8000 | 64.2 |

These data illustrate the desirable sound absorbing characteristics of the inventive foam compositions.

EXAMPLE 16

The viscosity of the Part A foam precursor fabricated in accordance with Example 9A was tested in accordance with conventional methods and apparatus (Brookfield Viscometer, Spindle 27, Thermal-Cell). The viscosity as a function of temperature is listed below.

| RPM | Temp 75° F. | Temp 110° F. | Temp 150° F. |
|---|---|---|---|
| 0.5 | 13,000 | 8,000 | 3,000 |
| 1 | 10,500 | 5,500 | 2,500 |
| 2.5 | 8,160 | 3,400 | 1,600 |
| 5 | 6,680 | 2,300 | 1,100 |
| 10 | 5,700 | 1,800 | 800 |
| 20 | 4,830 | 1,480 | 600 |
| 50 | 3,900 | 1,250 | 468 |
| 100 | 3,280 | 1,100 | 404 |

The viscosity of the Part B foam precursor fabricated in accordance with Example 9A was tested in accordance with conventional methods and apparatus (Brookfield Viscometer, Spindle 27, Thermal-Cell). The viscosity as a function of temperature is listed below.

| RPM | Temp 75° F. | Temp 110° F. | Temp 150° F. |
|---|---|---|---|
| 0.5 | 22,000 | 13,000 | 4,000 |
| 1 | 20,000 | 10,000 | 2,500 |
| 2.5 | 18,600 | 7,000 | 1,600 |
| 5 | 17,800 | 5,320 | 1,300 |
| 10 | 17,300 | 4,500 | 1,100 |
| 20 | | 4,000 | 975 |
| 50 | | 3,700 | 880 |
| 100 | | 3,580 | 860 |

EXAMPLE 17

This Example illustrates foam formation as a result of being activated by exposure to an energy source, e.g, UV light. A radiation curable foam having the following components was prepared:

| COMPONENT | TRADE NAME | SUPPLIER | AMOUNT |
|---|---|---|---|
| Cycloaliphatic epoxy | UVACURE 1500 | Radcure | 50 wt. % |
| Polyester polyol | Tone 0301 | Union Carbide | 40 |
| Mechanical blowing agent | Expancel DU551 | Expancel Inc. | 9 |
| Sulfonium salt | UVI-6974 | Union Carbide | 1 |

The above components were combined as follows. The Uvacure and polyol were added together in a mixing vessel and mixed until the solution was clear. The UVI 6974 was added to the mixture, and mixed until substantially completely dispersed (about 2 minutes). The Expancels spheres were added to the mixture and mixed until substantially lump free. For best results, the minimum amount of mixing time, and shear were employed.

EXAMPLE 18

Foam was prepared by contacting the Part A with the Part B listed in the tables below in a 2.75" diameter by 1.92" height ointment can and mixed by hand. Reaction Time and Temperature were determined in accordance with conventional methods. The percent vertical expansion as well as the shrinkage were determined visually. The Shore A test was conducted using a Type A-2 Shore Durometer Hardness test unit that meets ASTM D2240 requirements. The Shore A test was conducted about 4 hours after foam formation. The instantaneous peak reading was recorded.

| Components Wt. % | SAMPLE NO | | | | |
|---|---|---|---|---|---|
| | 1 | 2 | 3 | 4 | 5 |
| Part A | | | | | |
| Uvacure 1500 | 30 | 30 | 30 | 30 | 30 |
| Microthene FP800-00 | 10 | 10 | 10 | 10 | |
| Airvol 203 S (PVOH) | 10 | 10 | 10 | 10 | 10 |
| Dicaperl CS 10-200 | | | | | 10 |
| Part B | | | | | |
| Tone 0301 (Polyol) | 29.65 | 29.65 | 29.65 | 29.65 | 29.65 |
| Micropearls F30D | 14.85 | 10 | 12 | 16 | 14.85 |
| $H_3PO_4$ (Reagent:85%) | 5.5 | 5.5 | 5.5 | 5.5 | 5.5 |
| Rxn Time | 59 sec | 57 sec | 56 | 57 sec | 53 sec |
| Rxn Temp | 288° F. | 291° F. | 289° F. | 265° F. | 292° F. |
| % Vertical Expansion | 487% | 413% | 434% | 468% | 482% |
| Hardness-Shore A | 20 | 19 | 20 | 21 | 17 |
| Shrinkage | None | None | None | None | Very Slight |

| Components Wt. % | 6 | 7 | 8 | 9 |
|---|---|---|---|---|
| Part A | | | | |
| Uvacure 1500 | 30 | 20 | 30 | 30 |
| Microthene FP800-00 | 10 | 10 | 10 | |
| Airvol 203 S (PVOH) | 10 | 10 | 10 | 10 |
| Hycar 1300x13 | 10 | | | |
| PEP 6180 | | 10 | 5 | |
| Part B | | | | |
| Tone 0301 (Polyol) | 29.65 | 29.65 | 29.65 | 29.65 |
| Micropearls F30D | 14.85 | 14.85 | 14.85 | 14.85 |
| $H_3O_4$ (Reagent:85%) | 5.5 | 5.5 | 5.5 | 5.5 |
| Rxn Time | 65 sec | 64 sec | 58 sec | 61 sec |
| Rxn Temp | 265° F. | 238° F. | 289° F. | 270° F. |
| % Vertical Expansion | 385% | 205% | 404% | 528% |
| Hardness-Shore A | 22 | 23 | 26 | 18 |
| Shrinkage | Notice-able | Notice-able | Very Slight | Very Slight |

-continued

| Components Wt. % | 10 | 11 | 12 | 13 | 14 |
|---|---|---|---|---|---|
| Part A | | | | | |
| Uvacure 1500 | 30 | 30 | 20 | 30 | 30 |
| Microthene FP800-00 | | | 10 | 10 | |
| Airvol 203 S (PVOH) | 20 | 10 | 10 | 10 | 10 |
| Microthene FN514-00 | | 10 | | | 10 |
| DER 317 | | | 10 | | |
| Microthene FA700-00 | | | | | 10 |
| Part B | | | | | |
| Tone 0301 (Polyol) | 29.65 | 29.65 | 29.65 | 20 | 29.65 |
| Micropearls F30D | 14.85 | 14.85 | 14.85 | 14.85 | 14.85 |
| $H_3PO_4$ (Reagent:85%) | 5.5 | 5.5 | 5.5 | 5.5 | 5.5 |
| CN 301 | | | | 9.65 | |
| Rxn Time | 55 sec | 50 sec | 56 | 40 sec | 51 sec |
| Rxn Temp | 276° F. | 274° F. | 242° F. | 268° F. | 277° F. |
| % Vertical Expansion | 494% | 396% | 226% | 361% | 388% |
| Hardness-Shore A | 16 | 23 | 22 | 42 | 22 |
| Shrinkage | None | Very Slight | Very Slight | Very Slight | Very Slight |

| Components Wt. % | 15 | 16 | 17 | 18 |
|---|---|---|---|---|
| Part A | | | | |
| Uvacure 1500 | 30 | 30 | 30 | 15 |
| Microthene FP800-00 | | | | 10 |
| Airvol 203 S (PVOH) | 10 | 10 | 10 | 10 |
| Equistar MU 76000 | 10 | | | |
| AC 6702 | | 10 | | |
| BTL 71001 | | | 10 | |
| Cryacure UVR 6128 | | | | 15 |
| Part B | | | | |
| Tone 0301 (Polyol) | 29.65 | 29.65 | 29.65 | 29.65 |
| Micropearls F30D | 14.85 | 14.85 | 14.85 | 14.85 |
| $H_3O_4$ (Reagent:85%) | 5.5 | 5.5 | 5.5 | 5.5 |
| CN 301 | | | | |
| Rxn Time | 55 sec | 50 sec | 49 sec | 56 sec |
| Rxn Temp | 271° F. | 280° F. | 292° F. | 259° F. |
| % Vertical Expansion | 406% | 415% | 519% | 326% |
| Hardness-Shore A | 19 | | 19 | 15 |
| Shrinkage | Very Slight | Very Slight | None | Very Slight |

| Components Wt. % | 19 | 20 | 21 | 22 | 23 |
|---|---|---|---|---|---|
| Part A | | | | | |
| Uvacure 1500 | 30 | 30 | 30 | 30 | 30 |
| Microthene FP800-00 | 10 | 10 | 10 | 10 | 10 |
| Airvol 203 S (PVOH) | 10 | | 10 | 10 | 10 |
| Quickrete Concrete Mix | | 20 | | | |
| DER 331 | | | | | 10 |
| Part B | | | | | |
| Tone 0301 (Polyol) | 29.65 | 29.65 | 29.65 | 29.65 | 29.65 |
| Micropearls F30D | | 14.85 | | | 14.85 |
| $H_3PO_4$ (Reagent:85%) | 8 | 5.5 | 5.5 | 5.5 | 5.5 |
| Excpancel 091DU80 | 14.85 | | | | |
| Expancel 642WU | | | 14.85 | 14.85 | |
| Rxn Time | | 52 sec | 55 sec | 52 sec | 54 sec |
| Rxn Temp | 298° F. | 282° F. | 289° F. | 285° F. | 270° F. |
| % Vertical Expansion | 183% | 282% | 460% | 450% | 378% |
| Hardness-Shore A | 75 | 18 | 10 | 12 | 43 |

-continued

| Components Wt. % | SAMPLE NO | | | | |
|---|---|---|---|---|---|
| Shrinkage | None | Very Slight | Very Slight | None | Noticeable |
| | 24 | 25 | 26 | 27 | |
| Part A | | | | | |
| Uvacure 1500 | 30 | 20 | 30 | 30 | |
| Microthene FP800-00 | 10 | 10 | 10 | | |
| Airvol 203 S (PVOH) | 10 | 10 | 10 | 10 | |
| Epalloy 8240 | | 10 | | | |
| Q325 | | | | 10 | |
| Part B | | | | | |
| Tone 0301 (Polyol) | | 29.65 | 29.65 | 29.65 | |
| Micropearls F30D | 14.85 | 14.85 | | 14.85 | |
| $H_3O_4$ (Reagent:85%) | 5.5 | 5.5 | 5.5 | 5.5 | |
| Acclaim 6300 | 29.65 | | | | |
| Expancel 051DU | | | 7.5 | | |
| Rxn Time | 46 sec | 55 sec | 72 sec | 50 sec | |
| Rxn Temp | | 278° F. | 323° F. | 274° F. | |
| % Vertical Expansion | 206% | 388% | 219% | 570% | |
| Hardness-Shore A | 23 | 39 | 53 | 21 | |
| Shrinkage | None | Noticeable | Very Slight | Noticeable | |
| | 28 | 29 | 30 | 31 | 32 |
| Part A | | | | | |
| Uvacure 1500 | | 30 | 30 | 30 | 30 |
| Microthene FP800-00 | 10 | 10 | 10 | 10 | |
| Airvol 203 S (PVOH) | 10 | 10 | 10 | 10 | 10 |
| Sartomer K126 | 30 | | | | |
| Epon 58005 | | | 10 | | |
| DER 736 | | | | 10 | |
| Sodium Silicate | | | | | 10 |
| Part B | | | | | |
| Tone 0301 (Polyol) | 29.65 | 29.65 | 29.65 | 29.65 | 29.65 |
| Micropearls F30D | 14.85 | | 14.85 | 14.85 | 14.85 |
| $H_3PO_4$ (Reagent:85%) | 5.5 | 5.5 | 5.5 | 5.5 | 5.5 |
| Expancel 820DU | | 14.85 | | | |
| Rxn Time | 50 sec | 50 sec | 54 sec | 61 sec | 58 sec |
| Rxn Temp | 285° F. | 296° F. | 273° F. | 271° F. | |
| % Vertical Expansion | 483% | 410% | 396% | 374% | 410% |
| Hardness-Shore A | 20 | 32 | 34 | 30 | 10 |
| Shrinkage | None | Noticeable | Noticeable | Significant | Significant |
| | 33 | 34 | 35 | 36 | |
| Part A | | | | | |
| Uvacure 1500 | 30 | 30 | 30 | 30 | |
| Microthene FP800-00 | | 10 | 10 | 10 | |
| Airvol 203 S (PVOH) | 10 | 10 | 10 | 10 | |

-continued

| Components Wt. % | SAMPLE NO | | | | |
|---|---|---|---|---|---|
| Q Cel 650-D | 10 | | | | |
| Texaphor Special | | 4 | | | |
| Blue Dish Wish Soap | | | 2 | | |
| Part B | | | | | |
| Tone 0301 (Polyol) | 29.65 | 29.65 | 29.65 | | |
| Micropearls F30D | 14.85 | 14.85 | 14.85 | 14.85 | |
| $H_3O_4$ (Reagent:85%) | 5.5 | 5.5 | 5.5 | 5.5 | |
| Expancel 820DU | | | | | |
| E-351 Polyol | | | | 29.65 | |
| Rxn Time | 49 sec | 68 sec | 71 sec | 40 sec | |
| Rxn Temp | 294° F. | | 281° F. | 295° F. | |
| % Vertical Expansion | 445% | 530% | 502% | 302% | |
| Hardness-Shore A | 18 | 13 | 23 | 38 | |
| Shrinkage | None | Very Slight | None | None | |
| | 37 | 38 | 39 | 40 | 41 |
| Part A | | | | | |
| Uvacure 1500 | 30 | 30 | 30 | 30 | 30 |
| Microthene FP800-00 | 10 | 10 | 10 | 10 | 10 |
| Airvol 203 S (PVOH) | 10 | 10 | 10 | | 10 |
| Shell CMD 50809 | | | 5 | | |
| Z6124 | | | | 2 | |
| Part B | | | | | |
| Tone 0301 (Polyol) | | | 29.65 | 29.65 | 29.65 |
| Micropearls F30D | 14.85 | 14.85 | 14.85 | 14.85 | 14.85 |
| $H_3PO_4$ (Reagent:85%) | 5.5 | 5.5 | 5.5 | 5.5 | 5.5 |
| Sartomer SB 400 | 29.65 | | | | |
| LIR 403 | | 14.65 | | | |
| Santolink X1-100 | | 15 | | | |
| 75% Isopropyl Alcohol | | | | | 9.65 |
| Rxn Time | 37 sec | 32 sec | 55 sec | | |
| Rxn Temp | 292° F. | | 305° F. | | |
| % Vertical Expansion | 345% | 188% | 462% | 561% | 638% |
| Hardness-Shore A | 39 | 45 | 32 | 15 | 3 |
| Shrinkage | Noticeable | None | Very Slight | None | Very Slight |
| | 42 | 43 | 44 | 45 | |
| Part A | | | | | |
| Uvacure 1500 | | 30 | 30 | 25 | |
| Microthene FP800-00 | 10 | 10 | 10 | 10 | |
| Airvol 203 S (PVOH) | 10 | 10 | 10 | 10 | |
| Uvacure 1502 | 30 | | | | |
| Expancel 461DU | | | 14.85 | | |
| Epon 1510 | | | | 5 | |

-continued

| Components Wt. % | SAMPLE NO | | | |
|---|---|---|---|---|
| Part B | | | | |
| Tone 0301 (Polyol) | 29.65 | 14.65 | 29.65 | 29.65 |
| Micropearls F30D | 14.85 | 14.85 | | 14.85 |
| $H_3O_4$ (Reagent: 85%) | 5.5 | | | |
| Santolink X1-100 | | 15 | | |
| Amberphos-54 | | 6.5 | 6.5 | 6.5 |
| Rxn Time | 67 sec | 45 sec | 51 sec | 82 sec |
| Rxn Temp | 282° F. | | 291° F. | |
| % Vertical Expansion | 450% | 440% | 340% | 334% |
| Hardness-Shore A | 25 | 43 | 35 | 43 |
| Shrinkage | None | Very Slight | None | Notice-able |

| | 46 | 47 | 48 | 49 |
|---|---|---|---|---|
| Part A | | | | |
| Uvacure 1500 | 30 | 30 | 30 | 30 |
| Microthene FP800-00 | 10 | 10 | | |
| Airvol 203 S (PVOH) | 10 | 10 | | |
| Erisys GE-60 | | 10 | | |
| SAT 200 (silyl) | | | 20 | |
| Kraton D1107 | | | | 5 |
| Part B | | | | |
| Tone 0301 (Polyol) | 20 | | | |
| Micropearls F30D | 14.85 | 14.85 | 14.85 | 14.85 |
| Amberphos-54 | 6.5 | | | |
| #1 Castor Oil | 9.65 | | | |
| Arcol LG-650 | | 29.65 | | |
| HQ54 (73% $H_3PO_4$) | | 6.5 | 6.5 | |
| Arcol DP-1022 | | | 29.65 | 29.65 |
| H3PO4 (75% technical grade) | | | | 6.5 |
| Rxn Time | 47 sec | 110 sec | 101 sec | 83 sec |
| Rxn Temp | 287° F. | | 289° F. | |
| % Vertical Expansion | 364% | 350% | 458% | 620% |
| Hardness-Shore A | 32 | 25 | 9 | 7 |
| Shrinkage | Very Slight | Very slight | Notice-able | Signifi-cant |

EXAMPLE 19

This Example illustrates the ability to tailor the inventive foam compositions and obtain foams having a wide range of characteristics. A foam of relatively low density was produced by in accordance with Example 18. The foam was obtained by combining the following foam precursors:

| AMOUNT | COMPONENT | TRADE NAME | SUPPLIER |
|---|---|---|---|
| | Part A: | | |
| 18.2 g | cylcoaliphatic epoxy | Uvacure 1500 | Radcure |
| 1.8 g | phenoxy resin | Phenoxy PKHP-200 | Paphen |
| 30 g | bis-A epoxy | D.E.R. 736 | Dow Chemical |
| | Part B | | |
| 29.65 g. | polyester polyol | Tone 0301 | Union Carbide |
| 14.85 g. | vinylidene chloride encapsulated n-butane | Micropearls F30D | Pierce & Stevens |
| 5.5 g. | phosphoric Acid (85%) | | ACROS |

Each component (Part A & B) was individually mixed by hand using a hand driven paddle in a cup or ointment can. The two were brought together in a single vessel, again mixed by hand, and allowed to react. The foam produced was similar in appearance to other types listed above, but had a final specific gravity 0.16 g/ml.

A skilled person in this art would understand that these exemplary processes an be modified by manipulating process variables such as time and temperature of each aforementioned mixing step, mixing rate (RPM), time under vacuum, radiation source (e.g., UV light) and length of exposure and distance from source, and level of vacuum (mm Hg) as well as operating a continuous process. While the above Examples illustrate a batch process a skilled person in this art after having reviewed and understood the instant disclosure, would be capable of manipulating the aforementioned process variables to tailor the instant composition for a virtually unlimited array of product applications.

While the present invention has been described in certain preferred embodiments thereof, it will be apparent that various substitution, omissions, modifications, and other changes which may be made without departing from the spirit of the invention. Thus, the present invention should be limited only by the scope of the following claims including equivalents thereof.

What is claimed is:

1. A method for producing a foam comprising:

(a) combining an A side component comprising a combination comprising at least one cationic epoxy and at least one phenoxy resin with a B side component comprising a combination comprising at least one acid source comprising at least one hydrogen donating Lewis Acid and at least one polyol while in the presence of an encapsulated blowing agent and under conditions sufficient to permit an exothermic reaction between at least a portion of said at least one cationic epoxy and said at least one hydrogen donating Lewis Acid; and (b) utilizing heat from the exothermic reaction so as to expand the combined components to form a foam.

2. A method for producing a foam comprising:

(a) providing a foam precursor comprising (i) at least one epoxy component, (ii) at least one photoinitiator, and (iii) an encapsulated blowing agent, (b) exposing the foam precursor to a source of radiation sufficient to activate the photoinitiator and cause an exothermic reaction, and utilizing the heat from the exothermic reaction so as to cause the blowing agent to expand.

3. The method of claim 2, wherein said photoinitiator is a UV photoinitator.

4. The method according to claim 2 wherein the epoxy compound and the photoinitiator are present in a single foam precursor composition.

5. The method according to claim 2 wherein the photoinitiator comprises a sulfonium salt.

6. A method for producing a foam comprising:

(a) combining an A side comprising at least one cationic epoxy component and at least one polyvinyl alcohol with a B side comprising at least one acid source component comprising at least one hydrogen donating Lewis Acid and at least one polyol while in the presence of at least one blowing agent and under conditions sufficient to substantially simultaneously with said combining provide an exothermic reaction between at least a portion of said at least one cationic epoxy and said at least one hydrogen donating Lewis Acid; and (b) utilizing heat from the exothermic reaction so as to expand the combined components to cause the blowing agent to expand thereby producing a self-supporting foam.

7. The method according to any one of claims 1, 2 or 6 further comprising c) recovery of the foam.

8. The method according to any one of claims 1, 2 or 6 wherein step (b) involves the use of an encapsulated blowing agent.

9. The method according to claim 8 wherein the encapsulated blowing agent comprises at least one hydrocarbon.

10. The method of claim 9 wherein the hydrocarbon comprises butane.

11. The method of claim 8 wherein said encapsulated blowing agent comprises a thermoplastic shell that comprises at least one member selected from the group consisting of vinylidene chloride, acrylonitrile, polyethylene, nylon, EVA and polypropylene.

12. The method of claim 11 wherein said thermoplastic shell comprises acrylonitrile.

13. The method according to any one of claims 1, 2 or 6 wherein the epoxy component comprises at least one member selected from the group consisting of bis-phenol A epoxy, bis-F epoxy, epoxy-modified elastomers, epoxy-modified polybutene, epoxy-modified polybutadiene, epoxy-modified ethylene propylene-diene rubber and cycloaliphatic epoxy.

14. The method according to any one of claims 1, 2 or 6 wherein step (a) occurs at least in part in a containment device.

15. The method according to claim 14 wherein the containment device comprises polyethylene, polyester, vinyl, ethylene vinyl acetate, nylon, ethylene vinyl acetate, styrene-isoprene-styrene, styrene-butadiene-styrene or other blocked copolymers, polybutadiene, polyamide, modified EVA's, modified polyethylene, modified polybutadiene, GMA, SBR or mixtures thereof.

16. The method of any one of claims 1, 2 or 6 wherein said blowing agent comprises at least one member selected from the group consisting of hydrazides, carbonamides, carbamates, fluorocarbons and hydrocarbons.

17. The method of any one of claims 1, 2 or 6 further comprising at least one member selected from the group consisting of acrylonitrile, ethylene vinyl acetate, polypropylene, polyethylene, rubber, phenoxy resin and powdered wax.

18. The method of any one of claims 1, 2 or 6 further comprising a filler comprising at least one member selected from the group consisting of fiberglass, mica, talc, magnesium silicate, metal, and ceramic spheres.

19. The method according to claim 1 or 6 wherein the B side further comprises a carrier material wherein said carrier interacts with said at least one acid source component to form an intermediate product.

20. The method of claim 19 wherein said carrier comprises at least one member selected from the group consisting of polyester polyols, polyvinyl alcohol and water.

21. The method of claim 1 or 6 wherein at least one of said A side and B side comprise at least one of fibers, particles, rods, tubes or powders.

22. The method of claim 1 or 6 wherein at least one of the A-side and the B-side further comprises at least one member selected from the group consisting of nylon, carbon, polyethylene, polypropylene, polytetrafluoroethylene and graphite.

23. The method of claim 1 or 6 wherein said A side comprises cycloaliphatic epoxy; the blowing agent and at least one member selected from the group consisting of polypropylene, polyethylene and polyvinyl alcohol.

24. The method of claim 1 or 6 wherein the B-side further comprises a polyester polyol.

25. The method of claim 1 or 6 wherein the “A” side comprises at least one epoxy compound, polyvinyl alcohol and a thermoplastic.

26. The method of claim 1 or 6 wherein the “B” side comprises a carrier comprising at least one polyol and an acid source.

27. The method of claim 1 or 6 wherein at least one of said A side and B side further comprises a surfactant.

28. The method of claim 1 or 6 wherein said B side comprises an intermediate product obtained by contacting said at least one acid source with at least one polyol.

29. The method of claim 1 or 6 wherein said acid source comprises at least one member selected from the group consisting of sulfonic acids, phosphoric acid, citric acid, carboxylic acid, tannic acid and oxalic acid.

30. The method of claim 29 wherein said acid source comprises phosphoric acid.

31. A method for producing a foam comprising:

(a) combining an A side component comprising a combination comprising at least one cycloaliphatic epoxy and at least one polyvinyl alcohol with a B side component comprising a combination comprising phosphoric acid and at least one polyester polyol while in the presence of at least one encapsulated blowing agent and under conditions sufficient to substantially simultaneously with said combining provide an exothermic reaction between at least a portion of said A side and said B side; and (c) utilizing heat from the exothermic reaction so as to expand the combined components to cause the blowing agent to expand thereby producing a self-supporting foam.

32. The method of claim 31 wherein said combining comprises introducing said components into a static mixer having helical vanes.

* * * * *